United States Patent [19]

Eguchi et al.

[11] Patent Number: 4,523,829
[45] Date of Patent: Jun. 18, 1985

[54] AUTOMATIC FOCUS DETECTING DEVICE

[75] Inventors: Mitsuo Eguchi; Kiyoharu Tagawa; Hitoshi Ogawa; Mikio Bandai; Nobuharu Nagashima, all of Saitama, Japan

[73] Assignee: Fuji Photo Optical Co., Ltd., Saitama, Japan

[21] Appl. No.: 581,678

[22] Filed: Feb. 21, 1984

[30] Foreign Application Priority Data

Mar. 11, 1983 [JP] Japan .................................. 58-41074

[51] Int. Cl.³ .............................................. G03B 3/00
[52] U.S. Cl. .................................... 354/406; 250/204; 352/140; 358/227
[58] Field of Search ........................ 354/402, 406–409; 358/227; 352/140; 250/201 PF, 204

[56] References Cited

FOREIGN PATENT DOCUMENTS 51-26030  3/1976  Japan .
54-39126  3/1979  Japan .
56-101111 8/1981  Japan .

Primary Examiner—William B. Perkey
Attorney, Agent, or Firm—Young & Thompson

[57] ABSTRACT

An automatic focus detecting device comprising an image sensor for electrically converting distributions of two images of an object which are formed by two restricted light beams passed through different areas in a zooming lens system into time sequence video signals which in turn are extracted at predetermined extraction intervals and directed to a correlator for deciding the degree of agreement between the two images. The video signal extraction is effected in two operation modes; one is for a high accuracy focus detection and the other for a rough accuracy focus detection. In the former operation mode, a time sequence video signal of a narrow image is extracted at short intervals and on the other hand, in the latter operation mode, a time sequence video signal of a wide image is extracted at long intervals. The automatic focus detecting device is set up to the rough accuracy focus detection mode in the early stage of operation and changed to the high accuracy focus detection mode when a rough focus detection is attained.

12 Claims, 8 Drawing Figures

AUTOMATIC FOCUS DETECTING DEVICE

BACKGROUND OF THE INVENTION

The present invention relates to an automatic focus detecting device for use with television cameras and motion picture cameras having a zoom lens and more particularly, to an automatic focus detecting device in which intervals at which a time sequence signal of two images formed by light beams passed through two different areas in a zooming lens system of the zoom lens is extracted are variable for obtaining a correlation between the two images.

Generally, in conventional TTL (through-The-Lens) type automatic focus detecting devices according to the base length type distance metering system, double images of an object are respectively obtained from two restricted light beams passed through different areas in a zooming lens system of a taking lens and the amount of shift between the posiitons at which the respective images are formed is measured for determining the focusing position. The above described type of automatic focus detecting device is more fully disclosed, for example, in Japanese Pat. unexamined publication No. 101111/'81. The principle of the above described type of automatic focus detecting device will now be explained by referring to FIG. 1.

In the automatic focus detecting device shown in FIG. 1, restricted light beams from an object passed through different areas A and B in a focal lens system 1 comprising focusing lens system 1a and zooming lens system 1b are caused to enter a beam splitter 2 so as to be divided into two pairs of light beams; one for image forming and the other for focus detecting. The image forming light beams are directed by an image forming lens system 3 to an image pick-up surface 4 of an image pick-up tube, self-scanning type photoelectric arrays or the like to form an image of the object thereon. The light beam for focus detection passed through the area B is caused to enter, through an image forming lens 5, the right side of a self-scanning type photographic array or image sensor 7 which may take the form of a charge coupled device (CCD) image sensor having a light receiving section and a transfer section. The other light beam passed through the area A is also caused to enter, through an image forming lens 6, the left side of the CCD image sensor 7. Upon moving the focusing lens system 1a along the optical axis 13 thereof, the images on the CCD image sensor 7 are caused to move in the opposite directions because the areas A and B are on a straight line 14 intersecting the optical axis 13 and are equidistant from the optical axis 13. When the optical image of the object on the image pick-up surface 4 is just focused, the amount of shift between the two images on the CCD image sensor 7 is equal to a predetermined value. On the other hand, when the optical image of the object is out of focus, that is, the image is focused in either front or rear of the image pick-up surface, the amount of shift between the two images on 7 is increased or decreased from the predetermined value depending on how much the focusing lens system is shifted.

The CCD image sensor 7 is driven by a CCD drive circuit 8 so as to provide a time sequence video signal corresponding to picture elements of the images formed on the CCD image sensor 7. In FIG. 2(a) which is a diagram showing a time sequence video signal of the images formed on the CCD image sensor 7, the reference numerals 15 and 16 designate the time sequence video signals of the images formed by the image forming lenses 5 and 6, respectively. The time sequence video signals 15 and 16 are directed to a binary circuit 9 to be converted into bistable state signals at a high logic level (hereinafter referred to as "H", when applicable) and a low logic level (hereinafter referred to as "L", when applicable) as shown in FIG. 2(b). A conventionally well-known type of signal converter according to a differential method, comparison method or the like is employed as the binary circuit 9. The bistable signals of the time sequence video signal are directed to a correlator 10 such as, for example, TC1004J (trade name) made by TRW company which has two shift registers capable of separately storing two series of the digital video signals by images shown in FIGS. 2(c) and (d), respectively. For providing the two series of the digital video signals, 64 CCD pixels to each side of the optical axis of the image forming lens 5, and consequently 128 pixels in total are allocated to each image formed by the light beam passed through the area B, on the other hand, 128 pixels to each side of the optical axis of the image forming lens 6 and consequently 256 pixels in total are allocated to the other image formed by the light beam passed thorugh the area A. The digital video signal attributable to the light beam passed through the area B (hereinafter referred to as "B data") is utilized as a reference signal with which the digital video signal attributable to the light beam passed through the area A (hereinafter referred to as "A data") has to be compared. By comparing the A data with the B data upon shifting the former relative to the later, the correlator 10 can provide a correlation signal (shown in FIG. 2(e)) representing the degree of agreement between these video signals which in turn is directed to an operation circuit 11. Specifically, when utilizing two shift register each having 128 bits, the correlation signal shows a degree of agreement of 128 pairs of signals from the respectively corresponding pixels. The correlation signal, which is variable between, for example, 0 (zero) and 5 volts, has the maximum value of 5 V when complete agreement between the two video signals stored in the respective shift registers occurs. Furthermore, the correlation signal shows 5 V after shifting the two video signals by 64 bits relative to each other when the focusing lens system 1a is in a focusing position.

A peak value of the correlation signal shown in FIG. 2(e) is detected by a peak hold circuit included in an operation circuit 11 in such a way as is shown in FIGS. 2(f) and (g). The operation circuit 11 can caluculate and amount of shift of the peak value from a reference value (at the position of the 64th bit in the above example) and direct it to a drive circuit 12. For automatically obtaining a focused image on the image pick-up surface 4, the drive circuit 12 controls a motor (not shown) to rotate in a forward or reverse direction according to the amount of shift calculated so as to move the focusing lens system 1a along its optical axis.

In such an automatic focus detecting device, there is, however, a problem that since the amount of shift between two images of an object is affected remarkably by the ratio of the zooming lens system, the correlation signal weakens due to a great amount of shift when using a zooming lens of high ratio. Especially it may occur that the A data and B data are not overlapped at all when the amount of shift is extremely great, resulting in a failure of focus detection. For solving such problens without reducing resolving power in the focus detection, it may be preferable to increase pixels contributing focus detection so as to ensure a large amount of shift between the two images. However, the means of solving the problem described above still leaves some problems to be solved. One of the problems is that, in devices which are adapted to effect a focus detection on the basis of a correlation between two time sequence video signals from an image sensor, the number of bits to be compared strongly affects focus detection speed and/or electricity consumption. Another problem is the difficulty of application of the means to a video camera which require high speed focus detection for a moving object and less electricity consumption for compactness.

OBJECT OF THE INVENTION

It is therefore an object of the present invention to provide an automatic focus detecting device which achieves focus detection even at high zooming ratios.

It is another object of the present invention to provide an automatic focus detecting device which can perform high speed focus detection even if the image used for focus detection is wide.

It is still another object of the present invention to provide an automatic focus detecting device in which less electricity is consumed.

It is further object of the present invention to provide an automatic focus detecting device which enables to selectively effect focus detection with high accuracy.

SUMMARY OF THE INVENTION

For accomplishing the above-mentioned objects, an automatic focus detecting device in accordance with the present invention is capable of changing the extent of the image to be detected and the intervals at which a time sequence video signal from an image sensor corresponding to that extent is extracted. In a preferred embodiment of the present invention, there are provided a high accuracy focus detecting mode in which a time sequence video signal of a narrow image is extracted at short intervals and a rough accuracy focus detecting mode in which a time sequence video signal of a wide image is extracted at long intervals. In the early stage of focus detection, the automatic focus detecting device is in the rough accuracy focus detecting mode to obtain a roughly detecting focus position. At the time the rough focus position is obtained, the high accuracy focus detecting mode is established in the automatic focus detecting device. Since a wide image can contribute to the rough accuracy focus detection, the automatic focus detecting device in the rough accuracy focus detecting mode cannot fail in focus detection even though a taking lens is used at a high zooming ratio. Furthermore, extraction intervals for the time sequence video signals are longer in the rough accuracy mode and thereby time sequence video signals as many as the number of picture elements in the high accuracy mode are extracted and provided for correlation means. Consequently, it is unnecessary to provide the correlation means with an increased number of composite elements thereof, so that an intricate circuit, a reduction in detection speed and an increase in electricity consumption in circuits are avoided.

BRIEF DESCRIPTION OF THE DRAWINGS

Other objects, features and advantages of the present invention will become apparent from the following detailed description taken in conjunction with the accompanying drawings, in which.

DETAILED DESCRIPTION OF THE INVENTION

A preferred embodiment of the present invention will be now described referring to the accompanying drawings, especially FIGS. 3 to 8.

Figure 1:
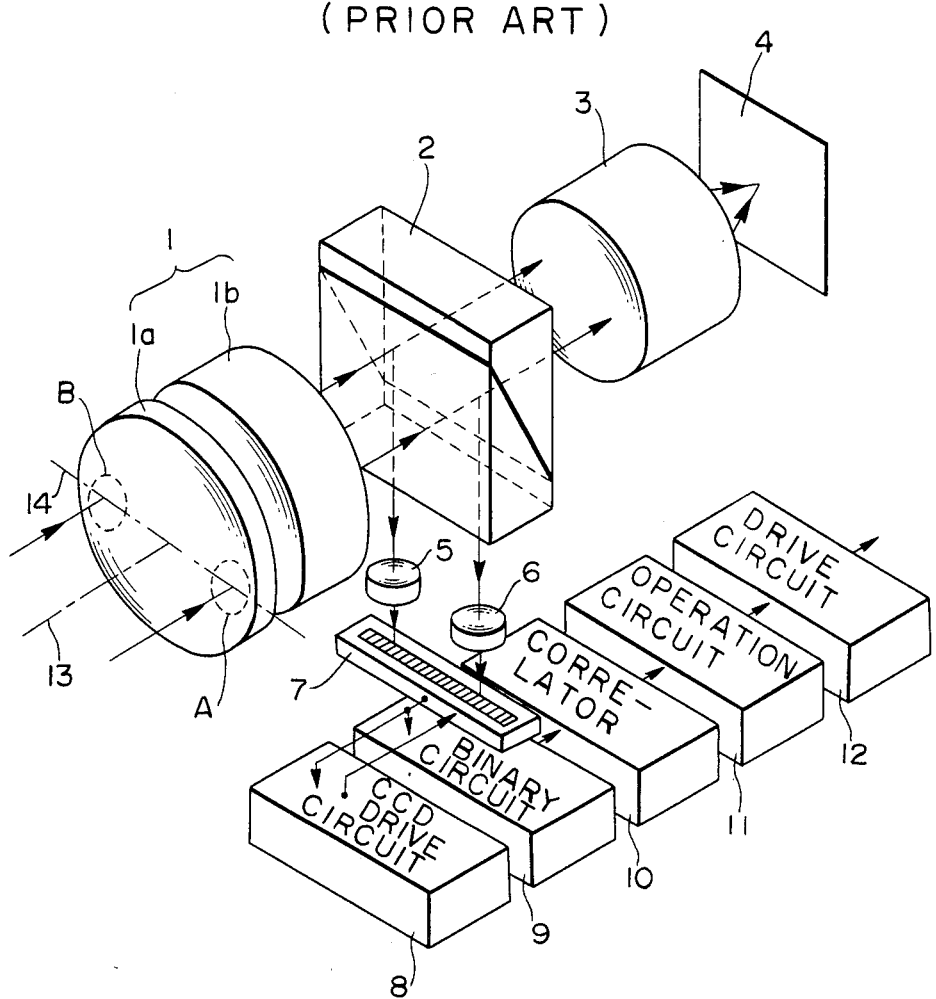
FIG. 1 is an explanatory diagram, partly as a block diagram, showing the arrangement of a conventional automatic focus detecting device.
Figure 3:
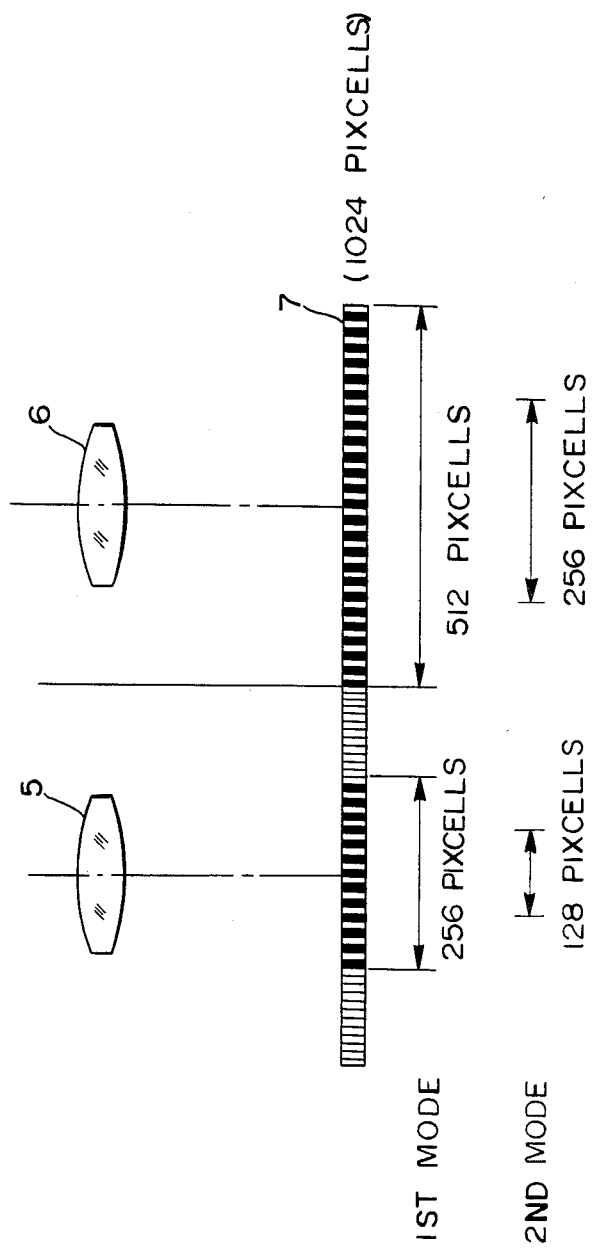
FIG. 3 is an explanatory diagram illustrating an image sensing section for a description of the principle of this invention.

FIG. 3 shows an image sensing section illustrating the principle of focus detection according to the present invention and in which, for the purpose of easy understanding, the same numerals as in FIG. 1 designate similar parts. First of all, it should be noted that, when using only one CCD image sensor for converting the intensity distributions of two images into time serial video signals, it is required to provide pixels the number of which is dependent on the zooming ratio of a zoom lens. That is, assuming that 512 pixels are necessary to effect the focus detection when the zoom lens is used at a zooming ratio of X6, 1024 pixels must be allocated at a zooming ratio of X12. Thus an increase of pixels to be allotted which depends upon increased ratios makes a correlation intricate and requires a long processing time.

Figure 2:
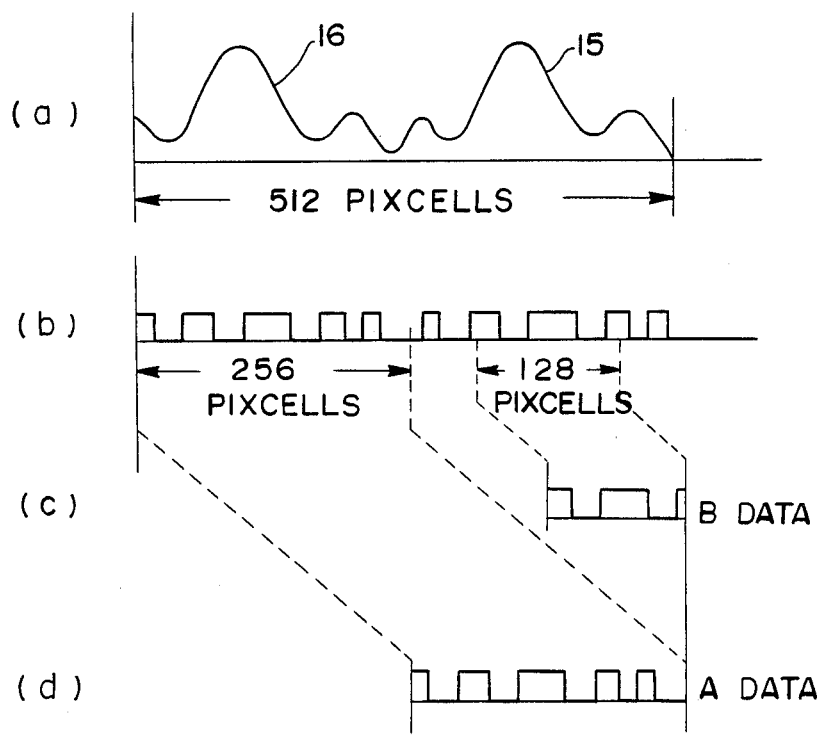
FIG. 2 shows waveforms appearing at various parts of the circuit shown in FIG. 1.
Figure 2:
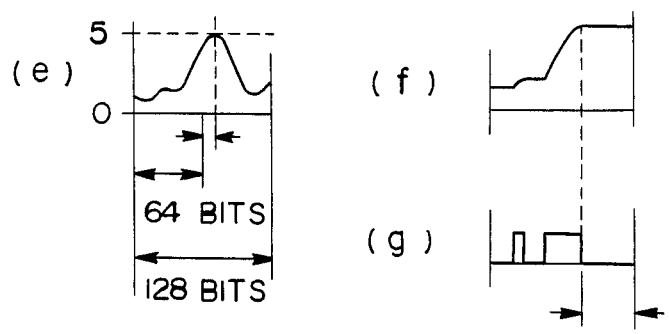

According to the present invention, in order to prevent the automatic focus detecting device from becoming impractical for focus detection at high zooming ratios, for example, a zooming ratio of X12, the automatic focus detecting device is set to the high accuracy detection mode (hereinafter referred to as "the first operation mode", when applicable) with the allotment of 1024 pixels of the CCD image sensor 7. On the other hand, at low zooming ratios, it is set to the rough accuracy detection mode (hereinafter referred to as "the second operation mode", when applicable) as shown in FIG. 2. In the first operation mode, the intensity distribution of a wide image of an object is converted into a time sequence video signal through the pixels and upon applying it to the correlator 10, it is extracted from every other pixels. Incidentally, although the accuracy of focus detection will be not satisfactory, the number of effective pixels is as many as at low zooming ratios. In FIG. 3, when the automatic focus detecting device is in the first operation mode, output signals are extracted from white pixcells but no output signals from black pixels. However, in the second operation mode, output signals presented at white and black pixels are extracted and applied to the correlator 10.

It is preferable to effect a focus detection in the second operation mode as far as possible even at high zooming ratios because of the rough accuracy focus detection in the above-mentioned first operation mode. In view of the above-mentioned observations, the automatic focus detecting device of one preferred embodiment according to the present invention is so designed that it may, in the early stage of operation, effect in the first operation mode a rough accuracy focus detection and is changed into the second operation mode for a high accuracy focus detection when the rough accuracy focus detection is attained.

Figure 4:
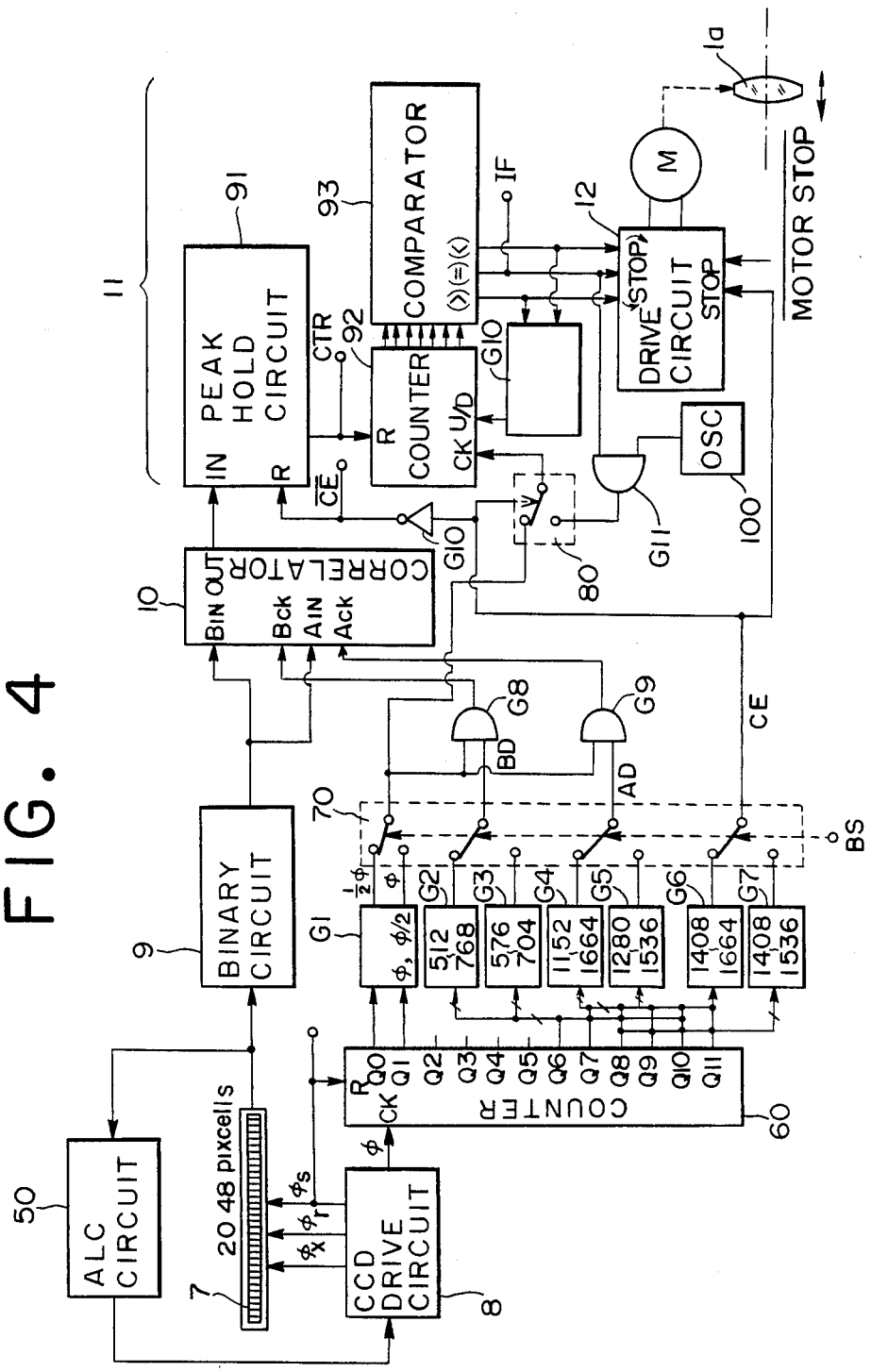
FIG. 4 is an explanatory diagram, partly as a block diagram, showing the entire arrangement of one embodiment of this invention.

Referring now to FIG. 4 showing the entire arrangement of a preferred embodiment of the present invention in which the same numerals as in FIG. 1 denote similar parts, there is shown the CCD image sensor 7 including 2048 pixels for expanding the base length, but the same number of effective pixels as shown in FIG. 3 are available. The intensity distributions of two images formed on the CCD image sensor 7 are converted into electrical signals for every picture element which in turn are shifted to the shift section of the CCD image sensor 7 by shift pulse $\Phi_s$ from the CCD drive circuit 8. The electrical signals are further directed to the binary circuit 9 after the transformation thereof into a time sequence video signal by read-out pulse $\Phi_x$ from the CCD drive circuit 8. The reset pulse $\Phi_r$ operates to cause the end part of the shift section to be reset every time the electrical signal corresponding to a picture element is read out. The time sequence video signal is also applied to an automatic level control circuit 50 (hereinafter referred to as "ALC" circuit) for integration; the result of integration which represents the luminance level of an object to be focused is applied to the CCD image sensor 7 and operates to change the intervals of the shift pulse $\Phi_s$ in dependence upon the level. It is to be noted that the ALC circuit 50 serves to expand equivalently the dynamic range of the CCD image sensor 7. A binary-coded signal which is provided by the binary circuit 9 is applied to the correlator 10. For binary-encoding the video signal, the video is suitably sampled, that is, the sampling intervals are variable. A counter 60 which has a countable number corresponding to the number of pixels is provided to count clock pulses $\Phi$ in synchronism with the read-out pulses $\Phi_x$ from the CCD drive circuit 8 and is adapted to be reset by the shift pulse $\Phi_s$. Consequently, the video signal obtained is one from the pixels whose place in the arrangement corresponds to the count value of the counter 60.

Here, a gate circuit G1 is adapted to provide, as a result of receiving $Q_0$ and $Q_1$ outputs from the counter 60, clock pulses which have the pulse widths of $\Phi$ and $\frac{1}{2}\Phi$, respectively and are utilized as extraction pulses for extracting signals from every one and two pixels, respectively. A logic gate circuit G2 is adapted to present, as a result of receiving Q6 to Q10 outputs from the counter 60, a high logic level "H" at its output terminal while counting clock pulses $\Phi$ from No. 512 to No. 768 and thus provides a gate signal which in turn operates to extract the B data for a rough accuracy focus detection. The logic gate circuit G3 presents, as a result of receiving Q6 to Q10 outputs from the counter 60, a high logic level "H" at its output terminal while counting clock pulses $\Phi$ from No. 576 to No. 704 and thus provides a gate signal which in turn operates to extract the B data for a high accuracy focus detection.

In the same way as is described above, logic gate circuits G4, G5, G6 and G7 present a high logic level at their output terminals while receiving clock pulses $\Phi$ from No. 1152 to No. 1664, No. 1280 to 1536, No. 1408 to No. 1664, and No. 1408 to No. 1536, respectively. The A data extraction signals from the logic gate circuits G4 and G5 are for a focus detection with a rough and a high accuracy, respectively. On the other hand, the logic gate circuits G6 and G7 provides correlation enabling signals (hereinafter referred to as "a CE signal") for focus detections with a rough and a high accuracy, respectively. A change from one state to the other, that is, from the first operation mode shown in FIG. 4 to the second operation mode takes place as a result of the operation of cooperating change over switches means which is operated by a bit selection signal (hereinafter referred to as "a BS" signal when applicable) which will be described later in detail. In such a way, the output signals from the respective logic gate circuits G1 to G7 are alternately utilized. Explaining more fully, the clock pulse having the pulse width of $\frac{1}{2}\Phi$ from the gate circuit G1 and the output signal from the logic gate circuit G2 are applied to an AND circuit G8 in the first operation mode and, in the second operation mode, the clock pulse pulse having the pulse the pulse width of $\Phi$ from the gate circuit G1 and the output signal from the logic gate circuit G3 are applied to the same AND circuit G8. When the AND circuit G8 is gated, the one provides an output which in turn is applied to the B data terminal Bck of the correlator 10. On the other hand, applied to an AND circuit 9 are the clock pulse of $\frac{1}{2}\Phi$ from the gate circuit G1 and the output from the logic gate circuit G4 in the first operation mode, and the clock pulse of $\Phi$ from the gate circuit G1 and the output from the logic circuit G5 and the second operation mode. The output from the AND circuit G9 is applied to the A data terminal Ack of the correlator 10.

The clock pulses of $\Phi$ and $\frac{1}{2}\Phi$ from the gate circuit G1 are also applied to a clock terminal Ck through an analog switch 80 to cause a counter 92 to detect a muximum peak value in the correlation ouput signals from the correlator 10. The CE signal mentioned hereinbefore is applied to a reset terminal R of a peak hold circuit 91 through an inverter G10 and operates to cause the peak hold circuit 91 to function effectively for effective correlation outputs and to actuate the stop terminal of a motor device circuit 12 to stop a motor M under the operation thereof. The peak hold circuit 91 is adapted to provide a reset signal (hereinafter referred as "the CTR" signal) which in turn operates to cause the counter to be reset when receiving a higher level of correlation output than the previous one held therein. The counter 92 provides an output which is applied to a comparator circuit 93 in which a count value, for example the count number of 64, representing a focusing position is previously set to decide whether the output is larger or smaller than or equal to the preset count value, i.e., the number of 64. According to the decision, the comparator circuit 93 provides a motor control output signal which in turn operates to cause the motor M to rotate in clockwise or counterclockwise direction or to stop. The motor control signals for clockwise and counterclockwise rotation of the motor M are applied to the up-down terminal U/D of the counter 92 after the conversion thereof into count-up or count-down signals through a logic gate circuit G10. To the clock terminal Ck of the counter 92, an output from an AND circuit G11 to which pulses provided by a low-frequency oscillator and a focus completion signal (hereinafter referred to as "a IF signal") and clock pulse $\Phi$ or $\frac{1}{2}\Phi$ are selectively applied by the changeover of the analog switch 80 which is caused by the CE signal.

Figure 5:
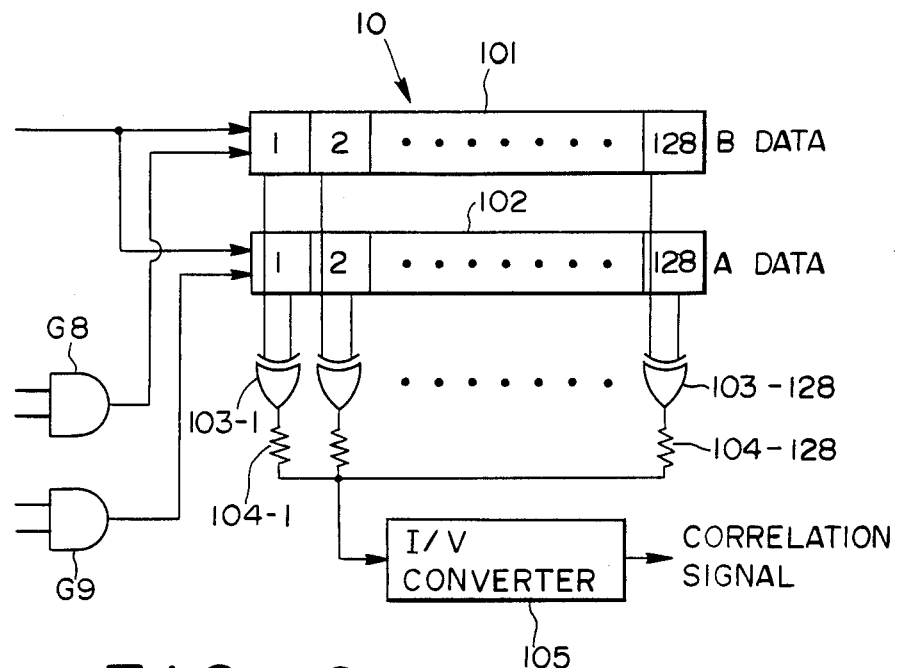
FIG. 5 is a block diagram showing one example of a correlator shown in FIG. 4.

Referring to FIG. 5 there is shown an example of the correlator 10 which includes shift registers 101 and 102 for storing B data and A data therein, respectively. Each of the shift registers 101 and 102 which has a capacity of 128 bits by way of example stores data therein with shifting successively one by one. The binary coded time serial video signals for 128 pixels are extracted by the clock pulse from the AND gate 8 to form the B data which in turn is stored in the shift register 101. After storing the B data in the shift register 101, the binary coded time sequence video signal is retrieved by the clock signal so that a part of the A data is stored in the shift register 102 one by one. Thus, 256 clock pulses in total can allow forming entirely the A data, which is shifted successively in the shift register 102 from the left to the right in FIG. 5.

The exclusive OR circuits 103-1 through 103-128 receive the corresponding pixels output data of the shift registers 101 and 102 to compare the data. Each exclusive OR circuit provides an output of the high logic level (H) when the data are equivalent to each other. The sum of the outputs from the respective exclusive OR circuits 103-1 through 103-128 which is obtained through registers 104-1 through 104-128 is inputted into I/V converter 105 for converting it from current value into voltage value which is utilized as a correlation signal. The I/V convertor 105 uses an operation amplifier so that the larger the current value is, the smaller the output voltage value becomes. Consequently, when the B data stored in the shift register 101 and a part of the A data stored in the shift register 102 agree, a correlation signal of the maximum voltage value, for example 5 V, is obtained. However, if a disagreement between them is shown, that is, there is given a difference between them, the correlation signal of voltage value becomes smaller as the difference increases.

Figure 6:
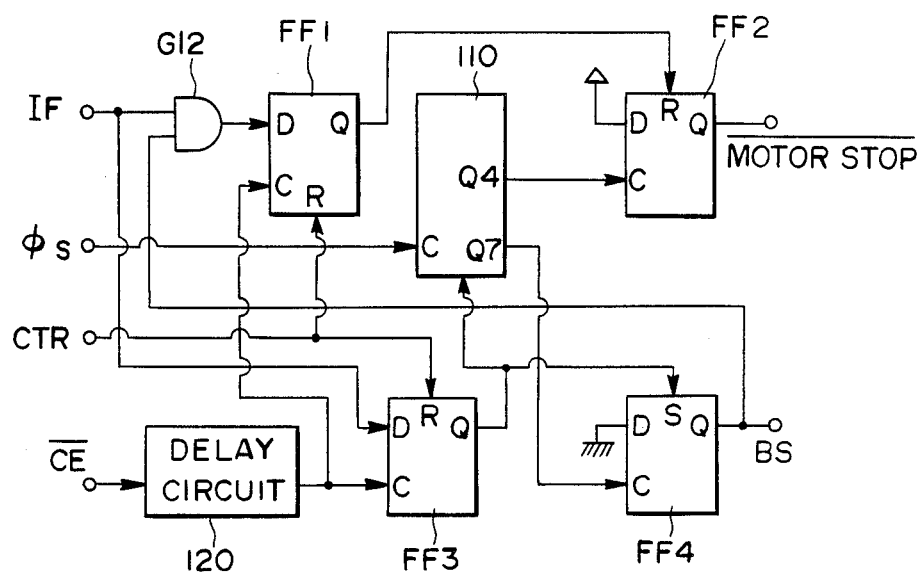
FIG. 6 is a circuit diagram showing a part for providing a bit select signal in FIG. 4.

FIG. 6 shows an example of a logic circuit which receives the output signals IF, $\Phi_s$, CTR and $\overline{CE}$ shown in FIG. 4 to provide the BS signal and a motor stop signal which operates to stop the motor M to prevent hunting. The IF signal is applied to the D terminal of a D type flip-flop FFI through an AND gate G12 which can give a logic product of the IF signal and BS signal, the signal $\Phi_s$ is applied to the clock terminal C of a counter 110. The CTR signal is applied to reset terminals R of the flip-flop FF1 and another D type flip-flop FF3, respectively. The last signal $\overline{CE}$ is applied to clock terminals of the flip-flop FF1 and FF2 through a delay circuit 120 which allows for the time which is required for the stabilization of operation of the logic circuit.

The flip-flop FF1 provides a Q output at the Q terminal which in turn is directed to a reset terminal of the D type flip-flop FF2 which receives "H" signal at the D terminal and an output Q4 (eight count output) from a counter 110 at the reset terminal C. The Q output of the flip-flop FF3 which receives the IF signal at the D terminal thereof is directed to both the reset terminal of the counter 110 and the reset terminal of the D type flip-flop FF4 which receives the "L" level signal at the D terminal thereof.

Figure 7:
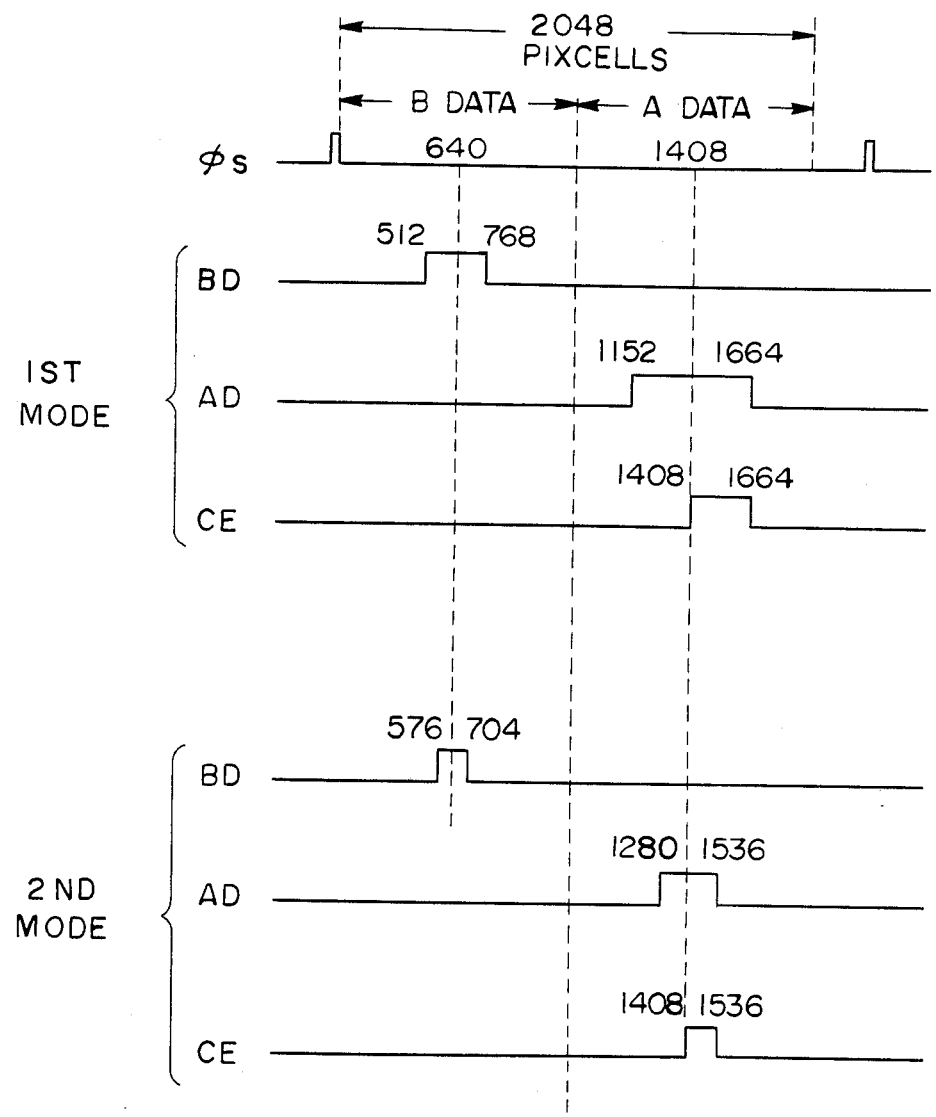
FIG. 7 shows waveforms of the signals AD and BD shown in FIG. 1.
Figure 8:
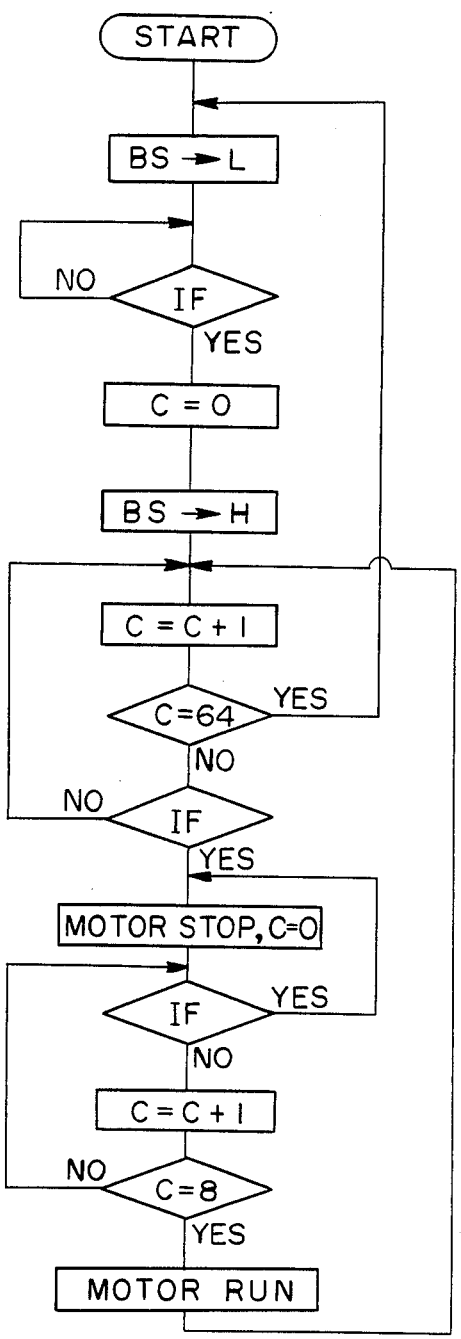
FIG. 8 is a flow chart of the operation of the circuit shown in FIG. 6.

The operation of the above described embodiment of the present invention will be described with reference to the time chart shown in FIG. 7 and the flow chart shown in FIG. 8 illustrating the operation of the logic circuit of FIG. 6.

In the early stage of focus detection, the analogue switch 70 is, in the first operation mode selection state, as shown in FIG. 4 since the BS signal is at "L" (a low logic level). The video signals into which the intensity distribution of an image formed on the CCD image sensor 7 is electrically converted are serially retrieved from every pixel of the CCD image sensor 7 one by one in response to the read-out pulse $\Phi_x$ and then provided as binary-coded signals at "H" or "L" by the binary encoder 9. The binary-coded signals are applied to both the data input terminals $A_{1N}$ and $B_{1N}$ of the correlator 10. It should be noted, however that the binary coded signals corresponding to the video signals from every other pixel in the presence of the clock pulses $\Phi$ No. 512 to No. 768 are stored in the register of the correlator since the data input terminal $B_{1N}$ is allowed to receive the clock pulses of $\frac{1}{2}\Phi$ only when the input terminal $B_{ck}$ of the correlator 10 is supplied with the BD pulses. After the completion of storing the binary coded video signals from every other pixel in the presence of the clock pulses $\Phi$ of No. 1152 to No. 1408 in the register of the correlator, the CE signal becomes "H" and thereby the correlator 10 provides and accurate correlation signal between the stored signal values in the registers 101 and 102. It is a matter of course that the binary coded video signals stored in the register 102 are shifted one by one according to each one of the clock pulses of No. 1408 to No. 1664 in order to make the correlation. In such a way, it is detected to which part of the video signals in the A data (AD) the video signals in the B data (BD) correspond. Consequently, the correlator 10 can present a maximum peak value of correlation signal upon the occurrence of the correct correspondence.

In the presence of the maximum peak value of correlation signal, the peak value hold circuit 91 operates to reset the counter 92 (which is countable to the maximum number of 128) which is counting the clock pulse of $\frac{1}{2}\Phi$. The number counted by the counter shows a count value corresponding to the maximum peak value, which is result of the expression (128-a counted number). The count value is directed to the comparator circuit 93 to decide whether it is larger or smaller than the value of "64", that is, whether the B data has shifted to the right or left side of the center of the A data or not. As a result of the decision, the comparator circuit 93 provides a signal which in turn operates to cause the gate circuit 10 to produce an U/D signal, that is, an up-count signal U when the count value is larger than the value of "64" and a down-count signal D when the count value is smaller that the same. On the other hand, the change over of the analog switch 80 which is caused by the CE signal after the completion of the correlation process allows the counter 92 to receive a low frequency clock pulse from the oscillator 100 through the Ck terminal thereof. Therefore, the counter 92 will now count-up or down at a slow frequency corresponding to the amount of shift from the value of "64" and when the count thereof reaches the value of "64", the provision of the IF signal is effected. Upon counting-up or down, the motor M is driven corresponding to the counted number so as to move the focusing lens system 1a from a defocusing position to the focusing position.

Referring again to FIGS. 6 and 8, upon the provision of the IF signal, the flip-flop FF3 provides Q output at the occurrence of the delayed $\overline{CE}$ signal, that is, at the completion of the correlation process to reset both the counter to the initial value (c=o) and the flip-flop FF4. As a result of this, the BS signal is raised to "H" to change the analog switch 70 into the second operation mode for a high accuracy focus detection.

Once the change of operation mode from the first to the second one is achieved, the same procedure as is described for the first operation mode is used for a focus detection (in this case, however, the clock pulse $\Phi$ and the extraction interval are different from those of the first operation mode). When there is provided no IF signal, the counter 110, which is adapted to be reset at the time the taking lens is just formed on the object in any mode of operation, is not reset and is left to count the shift pulses $\Phi_S$. In this case, when the count of the shift pulse of the counter 110 reaches "64" the Q output of the flip-flop 4 is lowered to "L" for the change of operation mode from the second to the first one. The count value, for example "64", is explained as follows. No change of operation mode is caused until at least 64 shift pulses $\Phi$ are counted when once the change to the second operation mode is effected, that is, the change to the first operation mode is caused for the first time only when there is provided no IF signal at all after the focus detecting operation has been done 64 times. The count value is a matter of choice taking into account the operation speed and other factors.

The IF signal, when it is obtained in the second operation mode, operates to render not only the flip-flop FF2 reset so as to provide a $\overline{\text{MOTOR STOP}}$ signal, also the counter 110 reset. However, because of the fact that the flip-flop FF2 at the clock input terminal receives the Q4 output (8 counts) from the counter 110, the flip-flop FF2 holds the MOTOR STOP signal for the prevention of hunting of the motor M regardless of the presence of the IF signal until the counter 110 counts at least shift pulses $\Phi_S$.

In the second operation mode, when there is no occurrence of the IF signal before the counting of 8 shift pulses $\Phi_S$, the output of the flip-flop FF2 is raised to "H" upon the disappearence of the $\overline{\text{MOTOR STOP}}$ signal. Thereafter, when there is no occurrence of the IF signal until the count of the counter 110 reaches 64, the change to the first operation mode is caused as described hereinbefore. The above is the way in which the change between the two operation modes is casued. Although, in the above described embodiment, the extraction of video signal from every other pixel is taken by way of example to explain the first operation mode, it is a matter of choice to extract video signals from every two, three, . . . pixels. Furthermore it may be possible to provide a plurality of second operation modes different in focus detection accuracy from one another in such a way that they are changed one after another and thereby the focus detection accuracy becomes gradually higher.

Since certain changes may be made in the above device without departing from the scope of the invention herein involved, it is intended that all matter contained in the above description or shown in the accompanying drawings shall be interpreted as illustrative and not in a limiting sense.

What is claimed is:

1. An automatic focus detecting device which is used with a camera having a taking lens comprising a focusing lens system, a zooming lens system and a master lens system for detecting the defocusing amount of said focusing lens system from the amount of shift occurring between two images of an object, said two images being formed by light beams passing through two different areas in said zooming lens system and moving in opposite directions as said focusing lens system moves along its optical axis, said device comprising:

an image sensor for converting the intensity distributions of said two images formed thereon into time sequence video signals, respectively;

correlation means for extracting said time sequence video signals from said image sensor to be stored therein in order to detect the amount of shift occurring between said two images; and extraction control means operable in at least first and second operation modes for extracting time sequence video signals of a narrow image every "M" ($\geq$ o) pixels in the first operation mode and a wide image every "N" (>M) pixels in the second operation mode.

2. An automatic focus detecting device as defined in claim 1 wherein said correlation means include first and second memories for storing said time sequence video signals separated by said images therein, a plurality of means for comparing pixels of said first and second memories corresponding to each other and means for adding up the outputs from said comparing means.

3. An automatic focus detecting device as defined in claim 2 wherein said image sensor provides repeatedly said time sequence video signals at predetermined intervals.

4. An automatic focus detecting device as defined in claim 3 wherein as said image sensor a CCD image sensor is employed.

5. An automatic focus detecting device as defined in claim 4 further including binary circuit for converting said time sequence video signals from said CCD image sensor into bistable video signals comprising high and low logic levels of signals.

6. An automatic focus detecting device as defined in claim 5 wherein as said memory a shift register is employed.

7. An automatic focus detecting device as defined in claim 6 wherein said shift register is caused to effect its shift operation by a frequency divided clock pulse, said clock pulse operating to retrieve said time serial video signal from said CCD image sensor.

8. An automatic focus detecting device as defined in claim 7 wherein one of said two images is an image of a narrow part of an object to be focused and the other is an image of a wider part including said narrow part of said object, and said time sequence video signal comprises a time sequence video signal of said narrow part image and a time sequence video signal of the other image that is retrieved following the former.

9. An automatic focus detecting device as defined in claim 8 wherein said extraction control means is in the second operation mode in the early stage of focus detecting operation and changed to the first operation mode when a predetermined amount of shift between said two images is detected in said second operation mode.

10. An automatic focus detecting device as defined in claim 9 further including a motor for moving said focusing lens system along its optical axis, said motor being caused to stop when said predetermined amount of shift is detected.

11. An automatic focus detecting device as defined in claim 10 wherein said extraction control means is changed to the first operation mode when a predetermined number of focus detecting operation is effected in the second operations mode.

12. An automatic focus detecting device as defined in claim 11 wherein the value of M is 0 (zero) and the value of N is 1 (one).

* * * * *